United States Patent [19]

Müller

[11] 4,443,346
[45] Apr. 17, 1984

[54] METHOD OF CLEANING FILTER ELEMENTS

[75] Inventor: Hans Müller, Erlenbac, Switzerland

[73] Assignee: DrM, Dr. Mueller, AG, Maennedorf, Switzerland

[21] Appl. No.: 412,857

[22] Filed: Aug. 30, 1982

[30] Foreign Application Priority Data

Sep. 2, 1981 [CH] Switzerland .......................... 5637/81

[51] Int. Cl.³ ............................................. B01D 29/38
[52] U.S. Cl. .................................... 210/785; 210/791; 210/323.2; 210/356
[58] Field of Search ............... 210/785, 354, 356, 357, 210/384, 385, 392, 791, 798, 427, 428, 323.1, 323.2

[56] References Cited

U.S. PATENT DOCUMENTS

| | | | | |
|---|---|---|---|---|
| 2,531,802 | 11/1950 | Bover | | 210/385 |
| 3,053,031 | 9/1962 | Vedder et al. | | 210/785 |
| 3,276,594 | 10/1966 | Gwilliam | | 210/356 |
| 3,326,382 | 6/1967 | Bozek et al. | | 210/356 |
| 3,356,215 | 12/1967 | Miles, Jr. | | 210/356 |
| 3,744,633 | 7/1973 | Schmidt, Jr. | | 210/785 |
| 3,834,535 | 9/1974 | Portyrata | | 210/356 |
| 3,983,036 | 9/1976 | Lauziral et al. | | 210/356 |

FOREIGN PATENT DOCUMENTS 1007294 5/1957 Fed. Rep. of Germany .

*Primary Examiner*—Charles N. Hart
*Assistant Examiner*—Wanda L. Millard
*Attorney, Agent, or Firm*—Michael J. Striker

[57] ABSTRACT

In a method of cleaning filter elements a removal of filter cakes formed on the filter cloth of the filter elements is accomplished by the application pressure and vacuum in the alternating fashion to the filter elements after the filtration process has been completed. The cleaning effect is improved due to the pressure fluctuations because the filter cloth expands upon those fluctuations and filter cake formed thereon is peeled off that filter cloth.

2 Claims, 2 Drawing Figures

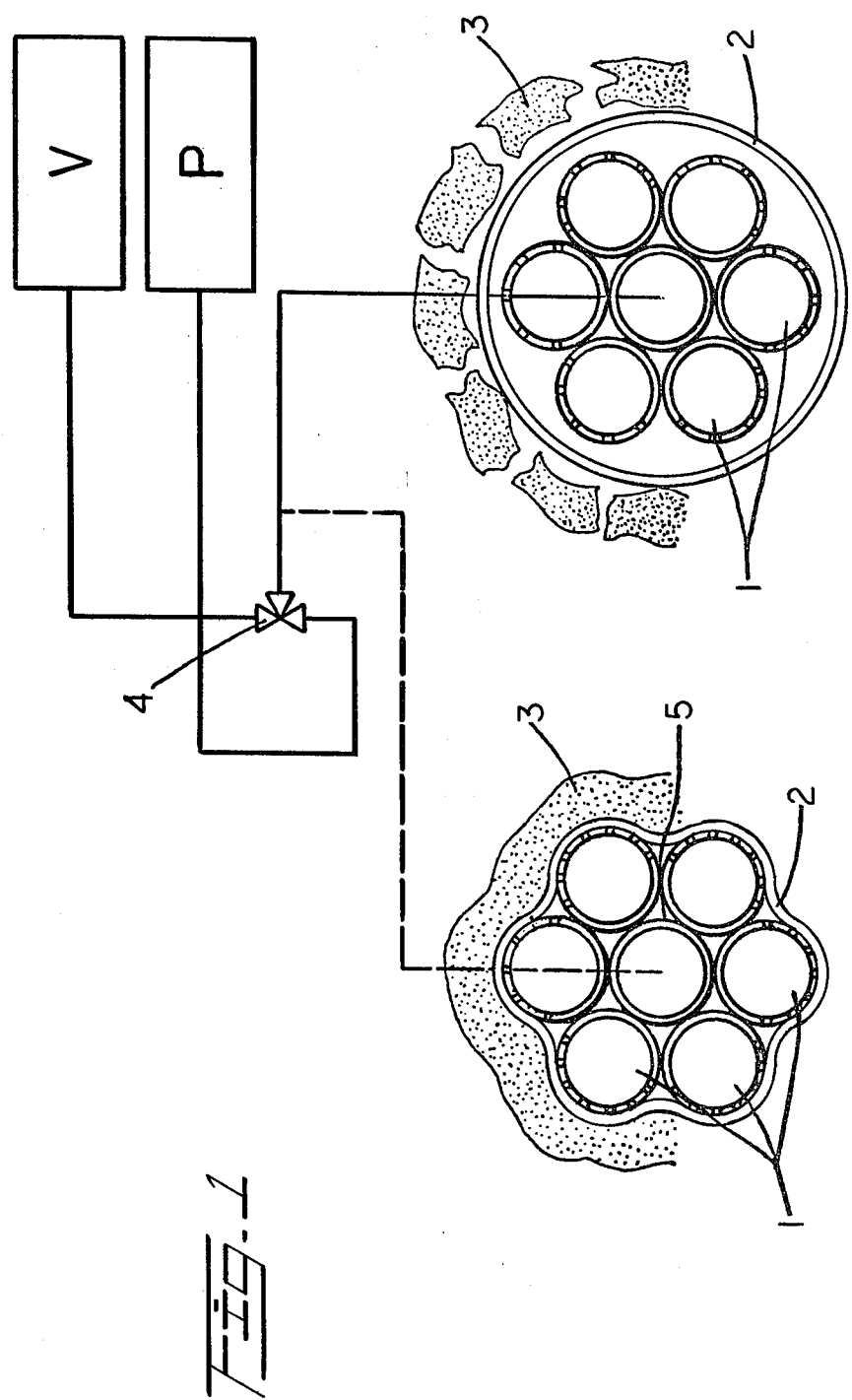

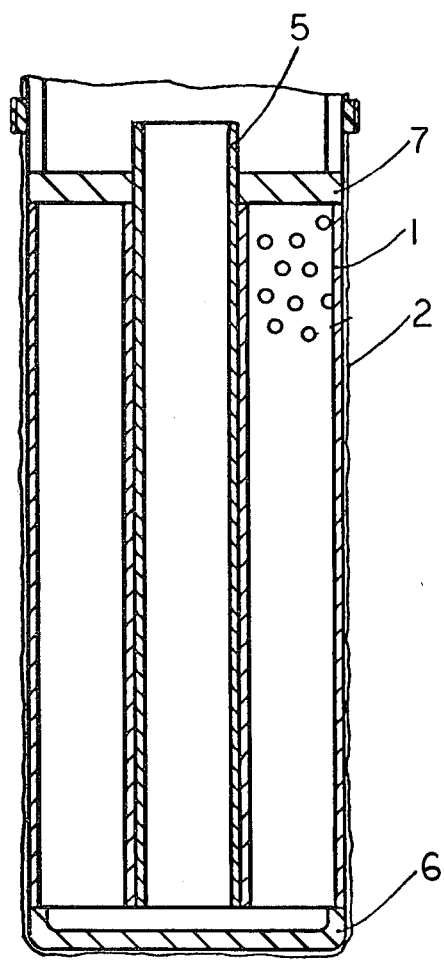

METHOD OF CLEANING FILTER ELEMENTS

BACKGROUND OF THE INVENTION

The present invention relates to methods of cleaning filter elements, particularly of the type including filter candles, by removing filter cake formed on the filter cloth of the filter element during filtration.

Conventional methods of releasing filter cakes from the surface of the filter cloth are usually performed after the filtering process has been completed.

During the filtration of liquids containing solid particles which should be separated from the liquid, filter cakes are usually built up on the filter cloth, which filter cakes are removed from the filter elements at the end of the filtration cycle.

Vibration of filtering elements with the filter cake formed thereon has been suggested for the removal of the filter cake. In such a method, vibrations are applied to the filter elements after the filtering process has been completed. The filter cake falls down on the bottom of the filter container and then is removed therefrom. This otherwise satisfactory cleaning process has the disadvantage that due to the application of vibrations to the filter element the filter cloth of the latter is so loaded that it may become defective.

One of the conventional methods of cleaning filter elements is disclosed in the German patent DE-PS No. 1,007,294. In the disclosed method pulsating movement is imparted to the filtering elements by pressure surges. For this purpose the filter candles are made elastic in the lengthwise direction thereof and during backwashing in this direction a pulsating movement under quickly changed pressures is imparted to a washing fluid flowing through the candles and thus to a filter cake formed on the filter candles, whereby the filter cake is separated from the filter cloth of the filter candles and drops. The filter elements or filter candles for this purpose are formed as folded bellows and for the additional elasticity wire coils are inserted into those bellows, which can expand in the lengthwise direction of the filter elements. As an additional stretching device a tension spring has been also suggested. All these movable mechanical components of the filter described in the German Pat. No. 1,007,294 are, however, subject to intensive wear. The conventional vibration movement imparted to the filter cloth has small amplitudes whereby total cleaning can not be accomplished in each case or this cleaning should take more time than desired.

SUMMARY OF THE INVENTION

It is an object of the invention to provide an improved method of cleaning alluvial filters.

It is another object of the invention to overcome disadvantages of conventional cleaning methods underlined above.

It is a still further object of the invention to provide a method of cleaning alluvial filters, which significantly improves cleaning results and provides for thorough and quick removal of filter cakes formed on the filter cloth of filter elements.

These and other objects of the invention are attained by a method of cleaning alluvial filters of the type including a plurality of candle-like filter elements having a filter cloth on which a filter cake is formed during filtration and a filtration conduit through which cleaning fluid is applied to said filter elements, the method comprising applying pressure to underpressure in the alternating fashion to said filtration conduit whereby the filter cake is separated from the filter cloth.

The step of applying pressure or underpressure in the alternating fashion can be performed under frequences increasing up to vibrations.

The underpressure can be developed through vacuum.

The underpressure can be also developed by applying overpressure to a filling space of the filter elements.

The pressure can be developed through applying overpressure in the filtration conduit.

A pressure source and a vacuum source can be connected to the interior of the filter via three-way valve which controls the pressure and vacuum alternatingly applied to the filter elements after the filtration process has been completed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 illustrates a schematical view showing a method of cleaning filter cloth of candle-like alluvial filters according to the invention; and FIG. 2 is a longitudinal section through a filter element for carrying out the method according to the invention.

DETAILED DESCRIPTION OF THE PREFERRED EMBODIMENT

FIG. 1 of the drawing shows at the left-hand side thereof a cross-section through a bundle of perforated tubes 1 at the stage of filtration whereas the similar cross-section of the bundle of tubes at the right-hand side of the drawing is illustrated at the stage of cleaning of the filter cloth. The filter cloth is identified with a reference character 2.

As seen in FIG. 2 the bundle of tubes 1, which are vertically suspended in a housing of the alluvial filter, are arranged in a compact fashion about a support central tube 5 which is mounted between a base 6 and lid 7 and serves for supporting of filter candles. These tubes 1 are formed of elastic synthetic plastic material which is resistant to chemicals and also resistant to high temperatures within a considerably wide temperature range.

The bundle of the tubes 1 are directly coated with the filter cloth 2 which during the filtering process takes a position of wave-like surface conforming to the outer surfaces of the tubes 1 and contracting radially inwardly. During the cleaning process, which usually takes place after the filtration has been completed, the filter cloth 2 stretches radially outwardly as seen at the right-hand side of the drawing.

As shown at the left-hand side of FIG. 1 filter cake 3 formed during the filtering process lies against the outer surface of the filtering cloth whereas during the cleaning process that cake is peeled off that outer surface.

V identifies a vacuum source and P identifies a pressure source. A three-way valve 4 supplies pressure or vacuum to the tubes 1 through respective conduits.

In order to separate and remove filter cake 3 from the filter cloth, pressure and vacuum are supplied into internal spaces of filter elements in the alternating fashion. A suitable fluid medium, e.g. gas or liquid, is used to provide for that alternating application of pressure and vacuum. Underpressure can be developed preferably by generating overpressure from the outside of the filter element. The pressure can be developed by generating underpressure at the exit of tube 5. Thereby, a maximal expansion of the filter cloth can be obtained and filter cake 3 can be totally removed. By increasing the frequency of alternating pressure-vacuum application to the degree of vibrations the practical cleaning effect can be substantially improved.

It will be understood that each of the elements described above, or two or more together, may also find a useful application in other types of methods of cleaning filter elements differing from the types described above.

While the invention has been illustrated and described as embodied in a method of cleaning filter elements, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of cleaning alluvial filters of the type including candle-like filter elements having a filter cloth on which a filter cake is formed during filtration and a filtration conduit through which a cleaning fluid is supplied to said filter elements, the method comprising applying pressure and vacuum in the alternating fashion to said filtration conduit after a filtration process has been completed whereby pressure fluctuations are generated under frequencies increasing up to vibrations which cause an alternating expansion of the filter cloth of the filter elements and the filter cake is separated from the filter cloth.

2. The method as defined in claim 1, wherein said pressure and vacuum are controlled by a three-way valve connected respectively to a pressure source and a vacuum source.

* * * * *